(12) United States Patent
Quimby et al.

(10) Patent No.: US 8,346,227 B2
(45) Date of Patent: *Jan. 1, 2013

(54) AUTOMATIC GAIN CONTROL IN A NAVIGATION DEVICE

(75) Inventors: David Quimby, Renton, WA (US); Ken Johnson, Seattle, WA (US); Leon L. Hong, Sammamish, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,358

(22) Filed: Oct. 25, 2011

(65) Prior Publication Data

US 2012/0040651 A1 Feb. 16, 2012

Related U.S. Application Data

(63) Continuation of application No. 12/752,999, filed on Apr. 1, 2010, now Pat. No. 8,073,440.

(60) Provisional application No. 61/173,059, filed on Apr. 27, 2009.

(51) Int. Cl.
*H04M 3/42* (2006.01)

(52) U.S. Cl. ........... 455/414.1; 455/69; 455/73; 455/76; 455/77; 455/41.2; 455/569.1

(58) Field of Classification Search ............ 455/69, 455/73, 76, 77, 41.2, 569.1, 564.2, 563
See application file for complete search history.

(56) References Cited

U.S. PATENT DOCUMENTS

| | | |
|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |

(Continued)

FOREIGN PATENT DOCUMENTS

CA 2242495 1/2000

(Continued)

OTHER PUBLICATIONS

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

(Continued)

*Primary Examiner* — Olumide T Ajibade Akonai
*Assistant Examiner* — Edward Zhang
(74) *Attorney, Agent, or Firm* — Stolowitz Ford Cowger LLP

(57) ABSTRACT

In one example, a Bluetooth enabled navigation device pairs with a mobile phone and then sends a plurality of tuning transmissions, each at a different transmission power gain amount, to a remote server using the mobile phone. These tuning transmissions are encoded using frequency tones that synthesize speech for transmission through the mobile phone and a voice channel of its wireless telecommunications network. The navigation device then tunes transmit power settings according to a received response to the tuning transmissions and uses the tuned transmit power settings for subsequent transmission to the remote server using this particular mobile phone.

14 Claims, 4 Drawing Sheets

U.S. PATENT DOCUMENTS

| | | |
|---|---|---|
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Loftberg |
| 4,598,272 A | 7/1986 | Cox |
| 4,599,583 A | 7/1986 | Shimozono |
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,817,089 A | 3/1989 | Paneth |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg et al. |
| 5,043,736 A | 8/1991 | Darnell |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby, III |
| 5,317,309 A | 5/1994 | Vervellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard et al. |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,533,121 A | 7/1996 | Suzuki |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,635,450 A | 6/1997 | Mayer |
| 5,637,355 A | 6/1997 | Stanforth |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles, II |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson, Jr. |
| 5,732,326 A | 3/1998 | Maruyama |
| 5,734,981 A | 3/1998 | Kennedy, III |
| 5,742,233 A | 4/1998 | Hoffman |
| 5,748,083 A | 5/1998 | Rietkerk |

| | | |
|---|---|---|
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob |
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,778,024 A | 7/1998 | McDonough |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott |
| 5,797,091 A | 8/1998 | Clise |
| 5,804,810 A | 9/1998 | Woolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley |
| 5,892,454 A | 4/1999 | Schipper |
| 5,901,179 A | 5/1999 | Urabe |
| 5,911,129 A | 6/1999 | Towell |
| 5,912,886 A | 6/1999 | Takahashi |
| 5,913,170 A | 6/1999 | Wortham |
| 5,915,210 A | 6/1999 | Cameron |
| 5,917,449 A | 6/1999 | Sanderford |
| 5,918,180 A | 6/1999 | Dimino |
| 5,930,340 A | 7/1999 | Bell |
| 5,930,722 A | 7/1999 | Han |
| 5,933,468 A | 8/1999 | Kingdon |
| 5,936,526 A | 8/1999 | Klein |
| 5,937,355 A | 8/1999 | Joong |
| 5,940,598 A | 8/1999 | Strauss |
| 5,945,944 A | 8/1999 | Krasner |
| 5,946,304 A | 8/1999 | Chapman |
| 5,946,611 A | 8/1999 | Dennison |
| 5,949,335 A | 9/1999 | Maynard |
| 5,953,694 A | 9/1999 | Pillekamp |
| 5,960,363 A | 9/1999 | Mizikovsky |
| 5,961,608 A | 10/1999 | Onosaka |
| 5,963,130 A | 10/1999 | Schlager |
| 5,963,134 A | 10/1999 | Bowers |
| 5,970,130 A | 10/1999 | Katko |
| 5,978,676 A | 11/1999 | Guidri |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine |
| 6,014,089 A | 1/2000 | Tracy |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,121,922 A | 9/2000 | Mohan |
| 6,122,271 A | 9/2000 | McDonald |
| 6,122,514 A | 9/2000 | Spaur |
| 6,131,067 A | 10/2000 | Girerd |
| 6,131,366 A | 10/2000 | Fukuda |
| 6,133,874 A | 10/2000 | Krasner |
| 6,140,956 A | 10/2000 | Hillman |
| 6,144,336 A | 11/2000 | Preston |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |
| 6,195,736 B1 | 2/2001 | Lisle |
| 6,208,959 B1 | 3/2001 | Jonsson |
| 6,212,207 B1 | 4/2001 | Nicholas |
| 6,226,529 B1 | 5/2001 | Bruno |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotichini |
| 6,300,875 B1 | 10/2001 | Schafer |
| 6,301,480 B1 | 10/2001 | Kennedy, III |
| 6,304,186 B1 | 10/2001 | Rabanne |
| 6,304,637 B1 | 10/2001 | Mirashrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,358,145 B1 | 3/2002 | Wong |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III |
| 6,430,162 B1 | 8/2002 | Reese |
| 6,430,176 B1 | 8/2002 | Christie, IV |
| 6,434,198 B1 | 8/2002 | Tarraf |
| 6,466,582 B2 | 10/2002 | Venters |
| 6,470,046 B1 | 10/2002 | Scott |

| | | |
|---|---|---|
| 6,477,633 B1 | 11/2002 | Grimmett |
| 6,493,338 B1 | 12/2002 | Preston |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,545,988 B1 | 4/2003 | Skog |
| 6,611,804 B1 | 8/2003 | Dörbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston |
| 6,683,855 B1 | 1/2004 | Bordogna |
| 6,690,681 B1 | 2/2004 | Preston |
| 6,690,922 B1 | 2/2004 | Lindemann |
| 6,697,987 B2 | 2/2004 | Lee |
| 6,700,867 B2 | 3/2004 | Classon |
| 6,707,421 B1 | 3/2004 | Drury |
| 6,747,571 B2 | 6/2004 | Fierro |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tiburtius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,283,904 B2 | 10/2007 | Benjamin |
| 7,286,522 B2 | 10/2007 | Preston |
| 7,317,696 B2 | 1/2008 | Preston |
| 7,372,833 B2 | 5/2008 | Kyronaho |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,508,810 B2 | 3/2009 | Moindadeh |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 | 9/2009 | Holmes |
| 7,586,240 B2 | 9/2009 | Tsuda |
| 7,593,449 B2 | 9/2009 | Shattil |
| 7,606,555 B2 | 10/2009 | Walsh |
| 7,653,383 B2 | 1/2010 | Natarajan |
| 7,688,260 B2 * | 3/2010 | Pomerantz et al. ...... 342/357.43 |
| 7,701,954 B2 | 4/2010 | Rabenko |
| 7,733,853 B2 | 6/2010 | Moinzadeh |
| 7,747,281 B2 | 6/2010 | Preston |
| 7,809,367 B2 | 10/2010 | Hellaker |
| 7,848,763 B2 | 12/2010 | Fournier |
| 7,856,240 B2 | 12/2010 | Gunn |
| 7,924,934 B2 | 4/2011 | Birmingham |
| 7,979,095 B2 | 7/2011 | Birmingham |
| 7,983,310 B2 | 7/2011 | Hirano |
| 8,036,201 B2 | 10/2011 | Moinzadeh |
| 8,036,600 B2 | 10/2011 | Garrett |
| 8,068,792 B2 | 11/2011 | Preston |
| 2002/0022465 A1 * | 2/2002 | McCullagh et al. .......... 455/260 |
| 2002/0071432 A1 | 6/2002 | Soderberg |
| 2002/0097706 A1 | 7/2002 | Preston |
| 2002/0111167 A1 | 8/2002 | Nguyen |
| 2002/0122401 A1 | 9/2002 | Xiang |
| 2003/0016639 A1 | 1/2003 | Kransmo |
| 2003/0206625 A9 | 11/2003 | Ahmad |
| 2003/0212562 A1 | 11/2003 | Patel |
| 2003/0227939 A1 | 12/2003 | Yukie |
| 2004/0034529 A1 | 2/2004 | Hooper, III |
| 2004/0192345 A1 | 9/2004 | Osborn |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan |
| 2005/0215228 A1 | 9/2005 | Fostick |
| 2005/0226202 A1 | 10/2005 | Zhang |
| 2005/0278169 A1 | 12/2005 | Hardwick |
| 2006/0059261 A1 | 3/2006 | Finkenzeller |
| 2006/0246910 A1 | 11/2006 | Petermann |
| 2006/0287003 A1 | 12/2006 | Moinzadeh |
| 2007/0087756 A1 | 4/2007 | Hoffberg |
| 2007/0124625 A1 | 5/2007 | Hassan |
| 2007/0155360 A1 | 7/2007 | An |
| 2007/0162834 A1 | 7/2007 | Banerjee |
| 2007/0211624 A1 | 9/2007 | Schmidt |
| 2007/0258398 A1 | 11/2007 | Chesnutt |
| 2007/0264964 A1 | 11/2007 | Birmingham |
| 2008/0025295 A1 | 1/2008 | Elliott |
| 2008/0039017 A1 | 2/2008 | Kim |
| 2008/0056469 A1 | 3/2008 | Preston |
| 2008/0107094 A1 | 5/2008 | Borella |
| 2008/0132200 A1 | 6/2008 | Shinoda |
| 2008/0140394 A1 * | 6/2008 | Holmes ........................ 704/213 |
| 2008/0143497 A1 | 6/2008 | Wasson |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0088180 A1 * | 4/2009 | LaMance et al. .......... 455/456.1 |
| 2009/0110033 A1 | 4/2009 | Shattil |
| 2009/0265173 A1 | 10/2009 | Madhavan |
| 2009/0298428 A1 | 12/2009 | Shin |
| 2009/0304057 A1 | 12/2009 | Werner |
| 2009/0306976 A1 | 12/2009 | Joetten |
| 2010/0197322 A1 | 8/2010 | Preston |
| 2010/0211660 A1 | 8/2010 | Kiss |
| 2011/0211625 A1 | 9/2011 | Birmingham |
| 2011/0287736 A1 | 11/2011 | Hirano |
| 2011/0312322 A1 | 12/2011 | Garrett |

FOREIGN PATENT DOCUMENTS

| | | |
|---|---|---|
| DE | 44 24 412 A1 | 1/1996 |
| DE | 199 48 966 A1 | 4/2000 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 753 A1 | 6/1993 |
| EP | 0 545 783 A1 | 6/1993 |
| EP | 0 580 397 A2 | 1/1994 |
| EP | 0 889 610 A2 | 1/1999 |
| EP | 0 896 442 A1 | 2/1999 |
| EP | 1 093 253 A2 | 4/2001 |
| EP | 1329693 A2 | 7/2003 |
| EP | 01 950 402 | 12/2004 |
| EP | 1 843 503 A2 | 10/2007 |
| GB | 2 290 005 A | 5/1994 |
| JP | 03232349 | 10/1991 |
| JP | 5130008 | 5/1993 |
| JP | 05-207107 | 8/1993 |
| JP | 5252099 | 9/1993 |
| JP | 6077887 | 3/1994 |
| JP | 11109062 | 4/1999 |
| JP | 2000-68925 | 3/2000 |
| JP | P3044064 | 3/2000 |
| JP | 2001-238256 | 8/2001 |
| TW | 2010/18163 A | 5/2010 |
| WO | WO 89/12835 A1 | 12/1989 |
| WO | WO 91/07044 A1 | 5/1991 |
| WO | WO 95/21511 A1 | 8/1995 |
| WO | WO 96/07110 A1 | 3/1996 |
| WO | WO 96/15636 A1 | 5/1996 |

| | | | |
|---|---|---|---|
| WO | WO 96/18275 A1 | 6/1996 |
| WO | WO 98/34164 A1 | 8/1998 |
| WO | WO 98/34359 A1 | 8/1998 |
| WO | WO 98/53573 A2 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | WO 99/49677 A1 | 9/1999 |
| WO | WO 00/11893 A1 | 3/2000 |
| WO | WO 01/78249 A1 | 10/2001 |
| WO | WO 01/99295 A2 | 12/2001 |
| WO | WO 02/54694 A1 | 7/2002 |
| WO | WO 03/34235 A1 | 4/2003 |
| WO | WO 03/081373 A2 | 10/2003 |
| WO | 2004/095818 A1 | 4/2004 |
| WO | WO 2009/149356 A2 | 12/2009 |

OTHER PUBLICATIONS

Coleman, A., et al., "Subjective Performance Evaluation of the RPE-LTP Codec for the Pan-European Cellular Digital Radio System," Globecom '89, IEEE Global Telecommunications Conference and Exhibition, vol. 2, Nov. 27-30, 1989, pp. 758-761, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th sup. th IEEE Vehicular Technology Conference: on the Move in the 90's. May 6-9, 1990, pp. 323-325, IEEE, New York, New York.

Feher, "Modems for Emerging Digital Cellular-Mobile Radio System," IEEE Trans. On Vehicular Technology, vol. 40, No. 2, May 1991, pp. 355-365.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Brian W. Martin, "WatchIt: A Fully Supervised Identification, Location and Tracking System," Proceedings of the IEEE, 29th Annual 1995 International Carnahan Conference on Security Technology, Oct. 1995.

Reut, Anton B., "Remote Monitoring of Military Assets Using Commercial Leo Satellites," IEEE Universal Communications Conference Record, Nov. 6-8, 1995, Copyright 1995 IEEE.

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

Brown, et al., "A Reconfigurable Modem for Increased Network . . . " IEEE Trans. On Circuits & Systems for Video Technology, vol. 6, No. 2, Apr. 1996, pp. 215-224.

Jain et al, Potential Networking Applications of Global Positioning Systems (GPS), downloadable at http://www.cis.ohio-state.edu/~jain/papers/gps.htm, pp. 1-40, Apr. 1996.

U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, Aug. 20-22, 1997, pp. 758-761, IEEE, New York, New York.

Werb, Jay and Colin Lanzl, "Designing a Positioning System for Finding Things and People Indoors," IEEE Spectrum, Sep. 1998.

FCC E911 Order, CC Docket No. 94-102; dated Nov. 23, 1998-Jul. 1, 1999.

Werb, Jay and Colin Lanzl, "The Next Generation of Control: Local Positioning," abstract, Feb. 1999, vol. 26.

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.

Vaha-Sipila, A., URLs for Telephone Calls, Request for Comments: 2806, Network Working Group, Apr. 2000, 16 pages.

International Search Report PCT/US00/13288; dated May 15, 2000; Applicant: Integrated Data Communications Inc.

International Search Report PCT/US00/01157; dated May 23, 2000; Applicant: Integrated Data Communications Inc.

Lavigne, R.E. and P. Eng, "Trunking Versus Conventional Radio System," Proceedings of the IEEE, 34th Annual 2000 International Carnahan Conference on Security Technology, Oct. 23-25, 2000.

International Search Report PCT/US01/19845; dated Jun. 22, 2001; Applicant: Airbiquity, Inc.

International Search Report PCT/US01/20021, dated Aug. 21, 2001; Applicant: Airbiquity, Inc.

International Search Report PCT/US01/27238; dated Aug. 30, 2001; Applicant: Airbiquity, Inc.

Bilbao, Alfonso, m-Security (Security and Mobile Telephony), Proceedings of the IEEE 35th Annual 2001, International Carnahan Conference on Security Technology, Oct. 16-19, 2001.

McNichols, Shawn, "Keeping Your Assets Safe," published on the Internet at http://www.securitymagazine.com,CDA/ ArticleInformation/features/BNP_Features, posted Feb. 14, 2002, Copyright 2001-2002 by Business News Publishing Co.

"Tracking," published on the Internet at http://www.wisetrack.com/tracking.html, posted May 29, 2002, Copyright 2001 by TVL, Inc.

Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.

Lockwood Technology Corporation, "Asset Management," copyright 2002 by Lockwood Technology Corporation, published on the Internet at http://www.lockwoodtechnology.com/ asset_tracking. html, printed May 29, 2002.

International Search Report PCT/US02/00996; dated Jun. 24, 2002; Applicant: Airbiquity, Inc.

Office Action in U.S. Appl. No. 09/625,159 dated Apr. 9, 2003; 15 pages.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

Universal Mobile Telecommunications System (UMTS); Push Architecture (3GPP TR 23.976 version 6.1.0 Release 6); Jun. 2004; 36 pages.

Protean Research Group, "Anycast Routing for Mobile Services (ARMS) Project Overview," Published on the Internet at <http://tang.itd.nrl.navy.mll/5522/anycast/anycast_index.html>. Downloaded from the internet Jan. 19, 2005.

PCT/US2009/056834 International Search Report dated Dec. 30, 2009; 12 pages.

Stolowitz Ford Cowger LLP List of Related Cases dated Dec. 23, 2011.

International Search Report for PCT/US12/52712 dated Nov. 2, 2012; 4 pages.

Supplementary European Search Report for EP Application 08840726,7 dated Sep. 11, 2012; 40 pages.

* cited by examiner

AUTOMATIC GAIN CONTROL IN A NAVIGATION DEVICE

This application is a continuation of U.S. non-provisional Application No. 12/752,999 filed on Apr. 1, 2010, entitled: AUTOMATIC GAIN CONTROL IN A NAVIGATION DEVICE which is non-provisional of U.S. Provisional Application No. 61/173,059 filed on Apr. 27, 2009, entitled: AUTOMATIC GAIN CONTROL IN A PERSONAL NAVIGATION DEVICE, each of which is herein incorporated by reference in its entirety.

COPYRIGHT NOTICE

© 2011 Airbiquity, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Navigation devices (including Personal Navigation Devices (PNDs) and in-car electronic devices) output information to a user based on a location of the navigation devices. These navigation devices generally utilize the Global Positioning System (GPS) to determine the location, and then use speakers and/or displays to output map information, directions, etc.

To continue expanding and/or improving the features provided by navigation devices, there is a need to maximize opportunities for navigation devices to obtain network access, such as to the Internet. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a Bluetooth enabled navigation device pairs with a mobile phone and then sends a plurality of tuning transmissions, each at a different transmission power gain amount, to a remote server using the mobile phone. These tuning transmissions are encoded using frequency tones that synthesize speech for transmission through the mobile phone and a voice channel of its wireless telecommunications network. The navigation device then tunes transmit power settings according to a received response to the tuning transmissions and uses the tuned transmit power settings for subsequent transmission to the remote server using this particular mobile phone. Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
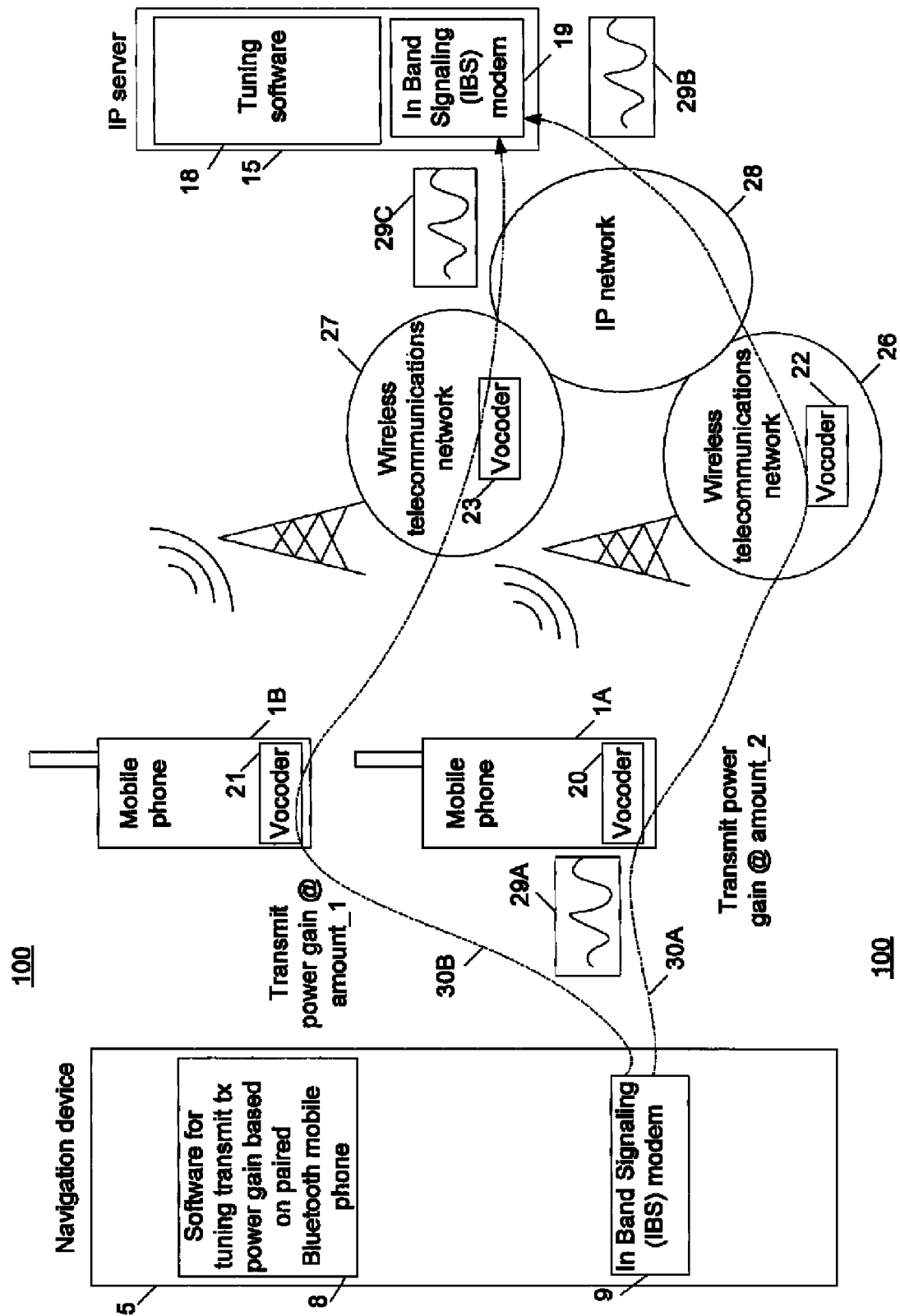
FIG. 1 illustrates a system for accessing a remote server with a navigation device using a Bluetooth capable mobile phone.

FIG. 1 illustrates a system for accessing a remote server with a navigation device using a Bluetooth capable mobile phone.

The system 100 includes a navigation device 5 configured to upload data to the remote Internet Protocol (IP) server 15 through an available one of the mobile phones 1A-B. The software 8 exchanges tuning communications with the software 18 to tune transmit power gain on at least a per-phone basis, and then subsequently uses the tuned transmit power gain amounts according to which one of the mobile phones 1A-B is currently available. This tuning on at least a per-phone basis allows the navigation device 5 to communicate with the remote server 15 over a wide variety of mobile phones and wireless telecommunications networks, which in turn maximizes communication opportunities for the navigation device 5.

To appreciate how such tuning maximizes opportunities for the navigation device 5 to communicate with the server 15, consider how communications transmitted from the navigation device 5 to the server 15 are processed differently depending on which mobile phone 1A or 1B is used. Initially, depending on which one of the mobile phones 1A and 1B are used, the communications will be processed by different communication circuitry such as vocoders 20 and 21. Each of the vocoders 20 and 21 could affect the power gain of the signal differently, such as by changing the power gain by different amounts. Furthermore, the different wireless telecommunications networks 26 and 27 respectively associated with the mobile phones 1A and 1B can also have different vocoders 22 and 23, which can also affect signals differently. As a result of these differences, in the absence of tuning on at least a per-phone basis, a receiver can receive a signal that is too weak or too strong depending on which combination of vocoders process transmissions. While it is possible for the server 15 and/or its In-Band Signaling (IBS) modem 19 to detect errors resulting from recovery of a signal that is too weak or too strong and request retransmission, such retransmission takes time and can still result in a signal that is too weak or too strong.

In contrast, the system 100 tunes transmit power gain on at least a per-phone basis, which allows a transmission 29A from the navigation device 5 to be received and recovered by the IBS 19 with no errors or minimal errors regardless of which transmission path 30A or 30B is used by the navigation device 5. In other words, transmissions 29B and 29C can have substantially similar power gains despite the differences between the paths 30A and 30B.

This tuning on at least a per-phone basis means that transmit power gain can be set according to the specific available phone, not just tuned to the particular make or model of the available phone. Two mobile phones of the same make or model can also affect signal strength differently because the components within the mobile phones can have different operational characteristics. For example, electronic components are typically rated for performance within a range of values. Accordingly, some of these electronic components operate at the high end of the range while others operate at the low end of the range, which can result in two vocoders of the same model amplifying a signal differently during processing. For example, two resistors of the same model can exhibit different resistances, and these differences in turn affect power gain. For this reason, the software 8 and 18 tunes transmit power on at least a per-phone basis rather than a per-model basis.

Although the software 8 and 18 tunes transmit power on at least a per-phone basis, it should be noted that such tuning can be even more granular in some examples. This will be discussed later in greater detail with reference to FIG. 2.

Referring still to FIG. 1, it should be appreciated that the system 100 thus maximizes upload opportunities for the navigation device 5. Stated another way, the navigation device 5 is not restricted to communicate with the IP server 15 using any particular designated phone but rather can access server 15 when in range of nearly any Bluetooth enabled mobile phone.

Further to the point made in the previous paragraph, it is preferable for the navigation device 5 to utilize a mobile phone for uploads to the IP server 15 without regard to whether the available mobile phone supports a packet data connection over its wireless telecommunication network. For example, the illustrated mobile phones 1A-B do not support packet data connections over the wireless telecommunications networks 26 and 27, yet can be utilized by the navigation device 5 for IP network access, as will be described in the next paragraph.

For this and other reasons, transmissions from the navigation device 5 to the server 15, including the tuning transmissions that will be discussed later in greater detail, are modulated by the IBS modem 9 for transmission across a voice channel of the wireless telecommunication network. The IBS modem 9 modulates received digital data into audio frequency tones. These frequency tones are selected to synthesize speech so that the frequency tones will pass with minimal attenuation or corruption through the vocoder 20/21 of the available one of the mobile phones 1A-B and any vocoders 22/23 in the available wireless telecommunication network 26/27 (other networks between network 26/27 and the server 15 could operate vocoders as well). Before encoding and modulation into audio tones, the digital data preferably is formatted into one or more packets. A packet formatter may prepend, for example, a header and a sync pattern prior to the payload. Error correction bits, checksums and other enhancements to the packet may be added as well. The navigation device 5 can then transmit the IBS modulated communications 29A over a Bluetooth connection for voice data, to be forwarded over a voice channel of the wireless telecommunications network, through any intervening networks such as the IP network 28, received and demodulated by the IBS modem 19 (recovered into a bitstream), and then finally processed by the server 15.

It should be understood that reliable access to the server 15, or for that matter any remote network, can enable a wide variety of applications for the navigation device. Applications on the navigation device 5 that are part of the navigation system can obtain location-based information in real time can obtain real-time location based information. For example, the navigation device 5 could obtain real-time information about traffic accidents near a current location determined via GPS. The navigation device 5 can also download updates to an internal navigation database, e.g. updating a stored map to information about a new route.

Furthermore, any other type of application on the navigation device 5 can also be provided with remotely stored data using the tuned transmissions described herein. This allows the feature set of the navigation device 5 to be expanded to other applications not necessarily related to navigation. For example, an application on the navigation device 5 could be used to obtain stock quotes or other information available via the Internet. It should be understood it is possible for any type of application operating on the navigation device 5 to obtain access to any type of network as well.

It should be understood that the principles described herein can be applied to any Bluetooth capable mobile device regardless of whether such device has any navigation capabilities. Also, the principles described above can be applied regardless of whether the communication between the device and the mobile phone uses Bluetooth or some other wireless protocol.

It should be understood that power gain is based on the ratio of the signal output of a system to the signal input of the system. When the term transmit power gain is used, the relevant system is the navigation device 5 (or another device configured to upload data to a server). When the term receive power gain is used, the relevant system is the server 15.

Transmit power gain can be adjusted on the navigation device 15 using any known method for adjusting gain. This can include adjusting amplifiers, variable resistors, or other circuit components, in either an input stage or an output stage of a circuit on the navigation device 15.

Figure 2:
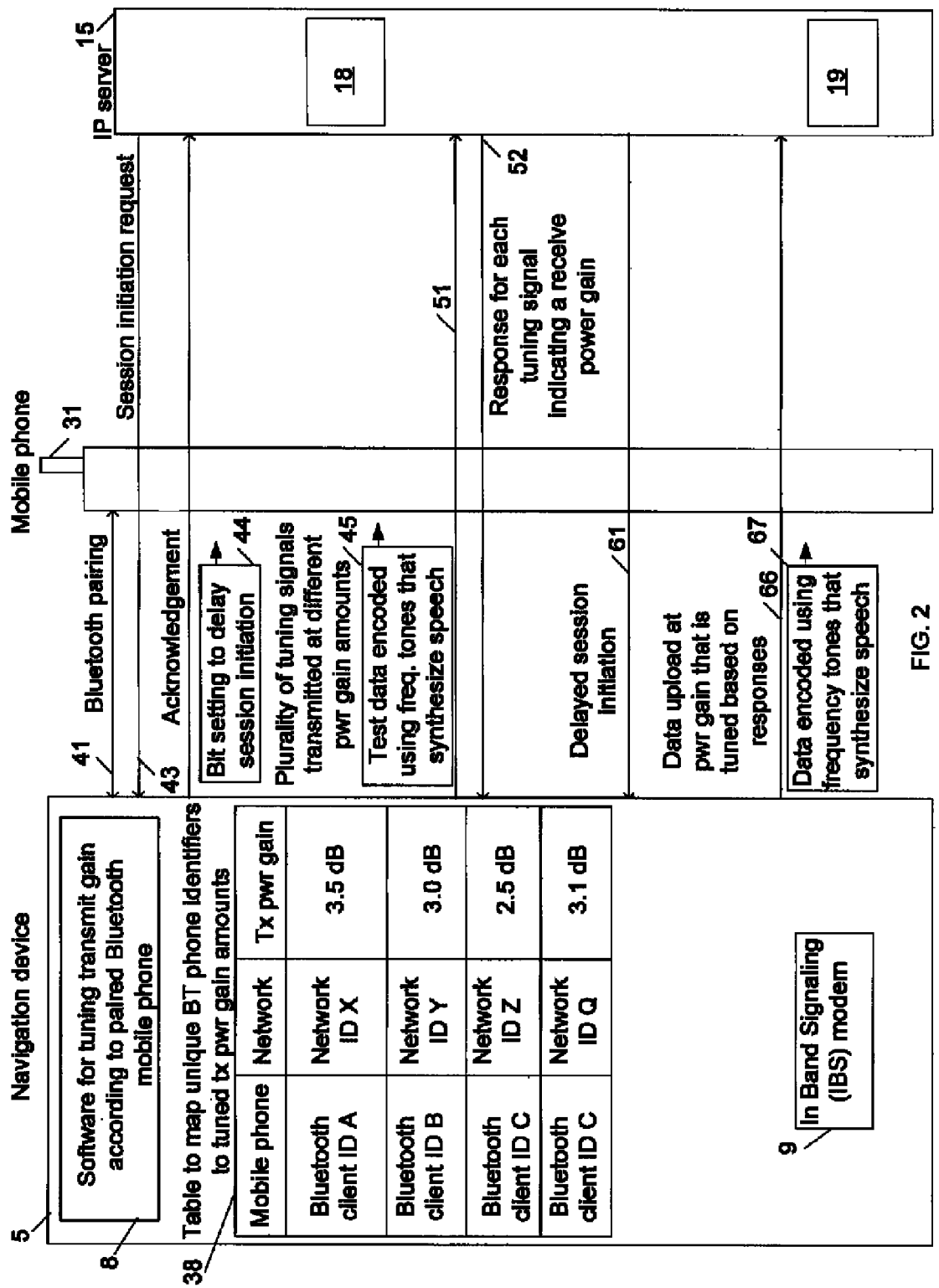
FIG. 2 illustrates the navigation device shown in FIG. 1 as well as interactions between the navigation device and the remote server for tuning transmit power gain.

FIG. 2 illustrates the navigation device shown in FIG. 1 as well as interactions between the navigation device and the remote server for tuning transmit power gain.

The navigation device 5 includes a table 38 to be updated by the software 8. The table 38 is later used to set a power gain used for transmitting data based at least in part on the available mobile phone.

In the example, the navigation device 5 pairs 41 with mobile phone 31 to establish a Bluetooth connection between the navigation device 5 and the mobile phone 31. This Bluetooth connection can be established according to the principles described in U.S. patent application Ser. No. 12/752, 911, "USING A BLUETOOTH CAPABLE MOBILE PHONE TO ACCESS A REMOTE NETWORK", which is herein incorporated by reference in its entirety for all purposes. Also, the pairing can be triggered by a request from an application operating on the navigation device 15 or from a user interface of the navigation device 15.

During pairing, the software 8 learns a Bluetooth client ID for the mobile phone 31. This Bluetooth client ID is a globally unique identifier that will be used to uniquely identify the mobile phone 31 in the table 38.

The mobile phone 31 receives a session initiation request from the IP server 15. The navigation device 5 processes the request 43 and then the software 8 uses a mechanism to delay session initiation. For example, the software 8 can causes the session initiation to be delayed by using a bit setting 44 in the acknowledgement or any other mechanism for delaying the session initiation. The software 18 is configured to observe the bit setting 44 and delay the session initiation accordingly.

The software 8 then generates test data 45 to be transmitted by modulating received digital data into audio frequency tones using IBS modem 9. These frequency tones are selected to synthesize speech so that the frequency tones will pass with minimal attenuation or corruption through any intervening vocoders. Before encoding and modulation into audio tones, the digital data may be formatted into one or more packets. A packet formatter may prepend, for example, a header and a sync pattern prior to the payload. Error correction bits, checksums and other enhancements to the packet may be added as well.

The software 8 then transmits the modulated test data 45 a plurality of times with each transmission 51 being at a different transmit power gain amount. For example, the test data 45 may be transmitted three times with each transmission being at a different power gain amount.

On the server 15 the software 18 receives the transmissions and determines a receive power gain. The software 18 sends back response 52 to indicate the determined receive power gain.

On the navigation device 5 the software 8 correlates the receive power gain for each transmission of the test data with the transmit power gain for that transmission. This correlation may be conducted according to information included in the response 52.

The software 8 then analyzes the receive power gain amounts. This analysis can include generating a graph containing receive power gain on one axis and transmit power gain on another axis. If the graph is used, the software 8 can connect points on the graph to generate a line graph. The line on the generated graph can then be used to interpolate transmit power gain that will generate a desired receive transmit power gain at the server 15. It should be apparent that the analysis of the receive power gain can operate completely independently of graphs but in any case a transmit power gain is interpolated based on the analysis of the receive transmit power gain. The interpolated transmit power gain will typically be a different value than the transmit power gain used in transmission 51, but it is possible to simply select from one of the transmit power gain amounts used in transmission 51.

The software 8 configures the navigation device 5 so that transmission will be at the power gain identified during the analysis. This can include setting a Bluetooth transceiver on the navigation device 5 or controlling any other software or hardware component on the navigation device 5. Accordingly, when delayed session initiation 61 occurs, transmissions 66 are at the set transmit power gain.

As discussed previously, the IBS modem 9 is used to modulate the packet data 67 of the transmissions 66. The IBS modem 19 recovers the data from the received communications, which are at a tuned receive power gain.

The software 8 also stores the interpolated transmit power gain in table 38 in association with the unique Bluetooth client identifier for the mobile phone 31. The table 38 shows entries in the mobile phone column and the transmit power gain column to illustrate such association. Thereafter, the transmit power gain amounts from the table 38 are used when transmitting data according to which mobile phone is used for the transmission.

The illustrated table 38 also includes the optional column including a network identifier to specify the wireless telecommunications network used during the tuning. This column can be used to provide additional granularity to the tuning. As discussed previously, different wireless telecommunication networks utilize different vocoders, which in at least some cases will have a significant effect on the receive power gain. Therefore, in some examples the tuning can be on a per-phone and per-network basis. This is illustrated in the table 38 where the Bluetooth client ID C is associated with two different transmit power gain amounts, 2.5 dB and 3.1 dB.

It should be understood that the principles described above can be used to add even more granularity to the tuning, e.g. further columns in the table. For example, the same phone/network vocoder combination can be associated with a plurality of tuned power gain amounts depending on the currently utilized mode of the vocoders. Vocoders can operate in different modes, e.g. full rate and half rate, and depending on which mode is used receive power gain can be affected differently. Accordingly, in one example the navigation device 5 determines a current mode of the vocoders and selects between the transmit power gain for this particular phone/network combination based on the current mode. Other possible columns include time of day, the identity of other networks intervening between the wireless telecommunications network and the server 15 (other networks such as IP networks can include vocoders), etc.

Thereafter, the software 8 can compare the Bluetooth client ID of an available mobile phone (and possibly other variables such as the network ID) to the table 38 and identify transmit power gain amounts. The software 8 then sets the Bluetooth transceiver on the mobile phone using the identified transmit power gain amount.

Once the transmit power gain has been set, the software 18 on the server 15 can continually monitor received transmissions from the navigation device. It is possible that receive power gain can "drift" or otherwise change over time despite the navigation device 5 continuing to use the same transmission settings with the same mobile phone. This can occur for many reasons such as the navigation device 5 and the available mobile phone roaming between networks, simply changing a distance from a tower, entering or leaving a power saving mode, etc. In any case, the software 18 can trigger the software 8 on the navigation device 5 to initiate a new tuning process at any time.

The software 18 can determine when a new tuning process is needed using any process. In one example, the software 18 continuously monitors receive power gain of transmissions from the navigation device and triggers initiation of a new tuning process if this receive power gain falls outside a threshold range. In another example, the software 18 monitors a rate of transmission errors over time and triggers initiation of a new tuning process if this transmission error rate exceeds a threshold. Since transmission errors can be related to other factors besides power gain, the software 18 could do some minimal troubleshooting to exclude transmission errors that are unlikely to be caused by power gain from this transmission error rate.

Although the session initiation request 43 was sent by the server 15 in the above described example, in other examples the navigation device 5 can send the session initiation request with the tuning performed before, after, or during the sending. In such an example it may not be necessary for the software 8 to cause a delay in session initiation.

Figure 3:
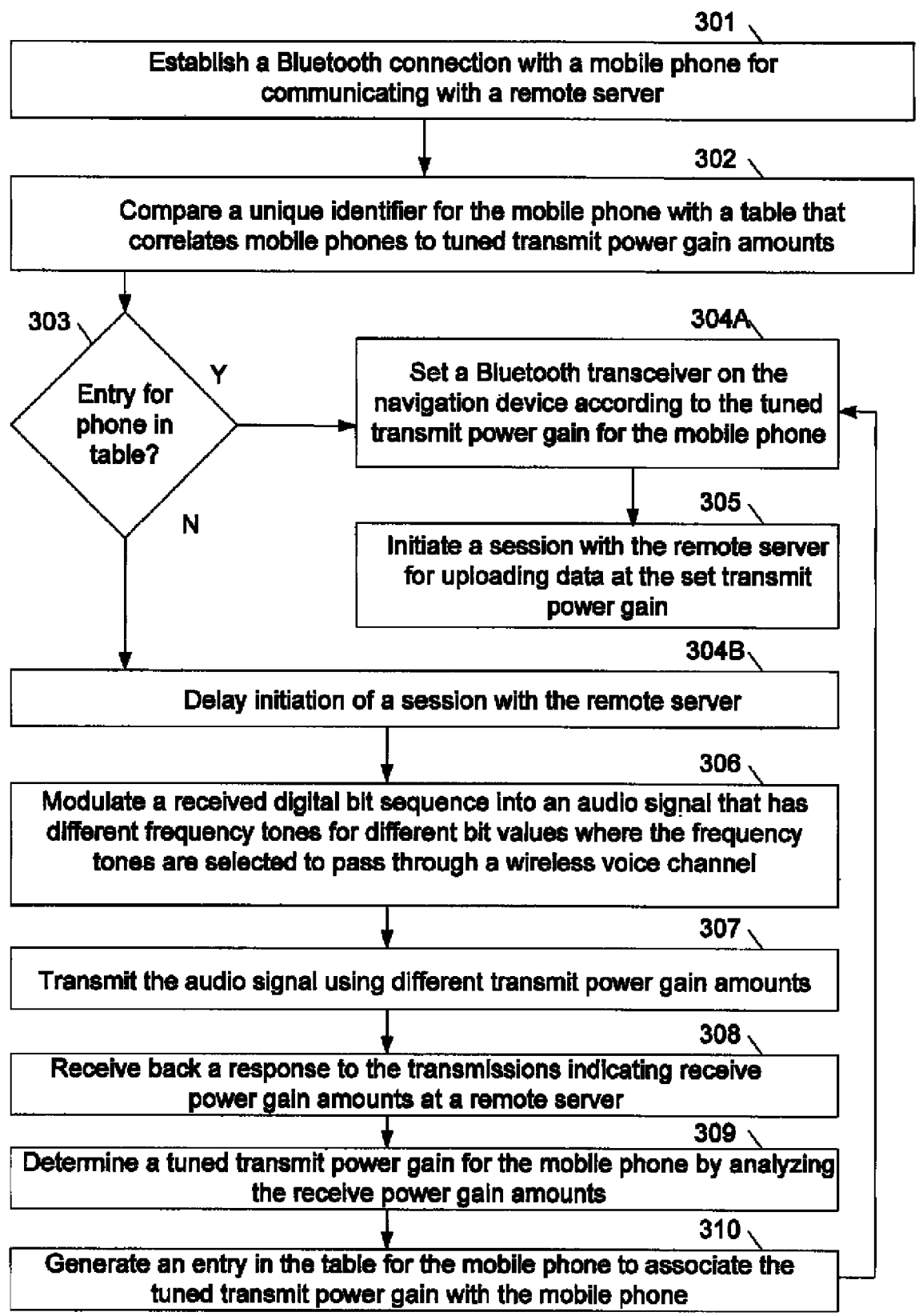
FIG. 3 illustrates how the navigation device shown in FIGS. 1 and 2 tunes transmit power gain.

FIG. 3 illustrates how the navigation device shown in FIGS. 1 and 2 tunes transmit power gain.

In block 301, the navigation device establishes a Bluetooth connection with a mobile phone for communicating with a remote server. The Bluetooth connection can be established as described in U.S. patent application Ser. No. 12/752,911, "USING A BLUETOOTH CAPABLE MOBILE PHONE TO ACCESS A REMOTE NETWORK".

In block 302, the navigation device compares a unique identifier for the mobile phone (and possibly other attributes such as a network identifier) with a table that correlates mobile phones to tuned transmit power gain amounts. If there is an entry for the mobile phone in the table in diamond 303, then in block 304A the navigation device sets a Bluetooth transceiver according to the tuned transmit power gain for the mobile phone. The navigation device initiates a session with the remote server for uploading data at the set transmit power gain in block 305.

If there is no entry in the table in diamond 303, then in block 304B the navigation device delays initiation of a session with the remote server. In block 306, the navigation device modulates a received digital bit sequence into an audio signal that has different frequency tones for different bit values where the frequency tones are selected to pass through a wireless voice channel. The navigation device transmits the audio signals using different transmit power gain amounts in block 307.

In block 308, the navigation device receives back a response to the transmissions indicating receive power gain amounts at a remote server. In block 309, the navigation device determines a tuned transmit power gain for the mobile phone by analyzing the receive power gain amounts. The navigation device generates an entry in the table for the mobile phone to associate the tuned transmit power gain with the mobile device in block 310. The process then returns to block 304A.

Figure 4:
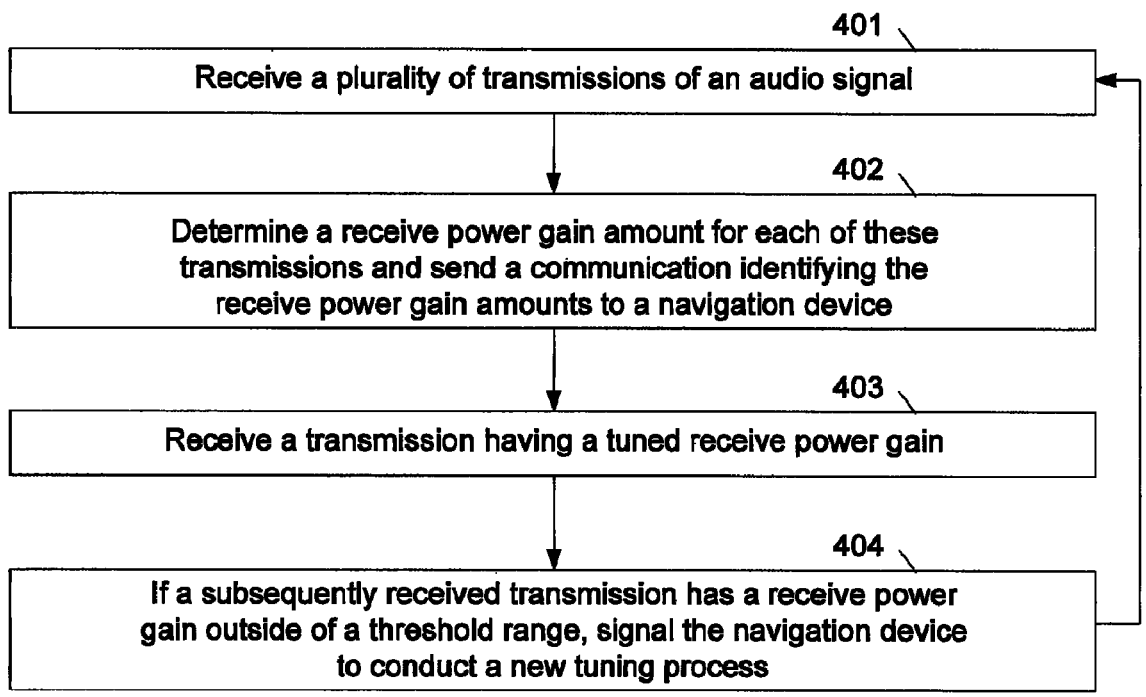
FIG. 4 illustrates how the server shown in FIGS. 1 and 2 tunes transmit power gain.

FIG. 4 illustrates how the server shown in FIGS. 1 and 2 tunes transmit power gain.

In block 401, the server receives a plurality of transmissions of an audio signal. In block 402, the server determines a receive power gain for each of these transmissions and sends a communication identifying the receive power gain to a navigation device.

Thereafter, the server receives a transmission having a tuned receive power gain in block 403. If a subsequently received transmission has a receive power gain outside a threshold range, in block 404 the server can signal the navigation device to conduct a new tuning process. The process then returns to block 401.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical navigation device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A memory device having instructions stored thereon that, in response to execution by a processing device, cause the processing device to perform operations comprising:
    transmitting communications to pass through a Bluetooth connection between a navigation device and a mobile phone and a wireless voice channel of a wireless telecommunications network associated with the mobile phone;
    inputting a digital bit sequence into a modulator to generate an audio signal that has different frequency tones for different bit values, wherein the frequency tones are selected to pass through the wireless voice channel unobstructed by vocoders operating within the wireless telecommunications network;
    using the modulator, generating and sending a first transmission according to a first transmit-side power gain amount;
    using the modulator, generating and sending a second transmission according to a second different transmit-side power gain amount;
    receiving back a response indicating receive-side power gain amounts for the first and second transmissions;
    determining a third transmit-side power gain amount by analyzing the response;
    using the modulator, generating and sending a third transmission according to the third transmit-side power gain amount;
    discovering a Bluetooth client identifier for the mobile phone; and
    generating an entry in a navigation device table to associate the discovered Bluetooth client identifier with the third transmit-side power gain amount.

2. The memory device of claim 1, wherein the navigation device table includes a plurality of entries each associating a custom transmit-side power gain amount with a Bluetooth enabled mobile phone.

3. The memory device of claim 1, wherein the navigation device comprises a portable personal navigation device.

4. The memory device of claim 1, wherein the navigation device comprises an in-vehicle navigation device that is installed in a vehicle.

5. A memory device having instructions stored thereon that, in response to execution by a processing device, cause the processing device to perform operations comprising:
- transmitting communications to pass through a Bluetooth connection between a navigation device and a mobile phone and a wireless voice channel of a wireless telecommunications network associated with the mobile phone;
- inputting a digital bit sequence into a modulator to generate an audio signal that has different frequency tones for different bit values, wherein the frequency tones are selected to pass through the wireless voice channel unobstructed by vocoders operating within the wireless telecommunications network;
- using the modulator, generating and sending a first transmission according to a first transmit-side power gain amount;
- using the modulator, generating and sending a second transmission according to a second different transmit-side power gain amount;
- receiving back a response indicating receive-side power gain amounts for the first and second transmissions;
- determining a third transmit-side power gain amount by analyzing the response;
- using the modulator, generating and sending a third transmission according to the third transmit-side power gain amount;
- discovering a Bluetooth client identifier for the mobile phone;
- identifying the wireless telecommunications network; and
- generating an entry in a navigation device table to associate a combination of the discovered Bluetooth client identifier and the wireless telecommunications network identification with the third transmit-side power gain amount.

6. The memory device of claim 5, wherein the navigation device table includes a plurality of entries each associating a custom transmit-side power gain amount with a combination of a Bluetooth enabled mobile phone and a mobile network.

7. A memory device having instructions stored thereon that, in response to execution by a processing device, cause the processing device to perform operations comprising:
- transmitting communications to pass through a Bluetooth connection between a navigation device and a mobile phone and a wireless voice channel of a wireless telecommunications network associated with the mobile phone;
- inputting a digital bit sequence into a modulator to generate an audio signal that has different frequency tones for different bit values, wherein the frequency tones are selected to pass through the wireless voice channel unobstructed by vocoders operating within the wireless telecommunications network;
- using the modulator, generating and sending a first transmission according to a first transmit-side power gain amount;
- using the modulator, generating and sending a second transmission according to a second different transmit-side power gain amount;
- receiving back a response indicating receive-side power gain amounts for the first and second transmissions;
- determining a third transmit-side power gain amount by analyzing the response;
- using the modulator, generating and sending a third transmission according to the third transmit-side power gain amount;
- receiving a communication indicating that a receive-side power gain is outside a predetermined range; and
- in response to receiving the communication, using the modulator, generating and sending a plurality of transmission according to a plurality of transmit-side power gain amounts to identify a new transmit-side power gain amount for use with the mobile phone.

8. A method, comprising:
- transmitting communications to pass through a Bluetooth connection between a navigation device and a mobile phone and a wireless voice channel of a wireless telecommunications network associated with the mobile phone;
- inputting a digital bit sequence into a modulator to generate an audio signal that has different frequency tones for different bit values, wherein the frequency tones are selected to pass through the wireless voice channel unobstructed by vocoders operating within the wireless telecommunications network;
- using the modulator, generating and sending a first transmission according to a first transmit-side power gain amount;
- using the modulator, generating and sending a second transmission according to a second different transmit-side power gain amount;
- receiving back a response indicating receive-side power gain amounts for the first and second transmissions;
- determining a third transmit-side power gain amount by analyzing the response;
- using the modulator, generating and sending a third transmission according to the third transmit-side power gain amount;
- identifying a currently available mobile phone in response to a communication request;
- comparing a unique identifier for the currently available mobile phone to a table associating mobile phones with the transmit-side power gain amounts;
- setting circuitry on the navigation device according to the comparison; and uploading data via the currently available mobile phone after setting the circuitry.

9. The method of claim 8, wherein the communication request is received over a user interface of the navigation device.

10. A method, comprising:
- transmitting communications to pass through a Bluetooth connection between a navigation device and a mobile phone and a wireless voice channel of a wireless telecommunications network associated with the mobile phone;
- inputting a digital bit sequence into a modulator to generate an audio signal that has different frequency tones for different bit values, wherein the frequency tones are selected to pass through the wireless voice channel unobstructed by vocoders operating within the wireless telecommunications network;
- using the modulator, generating and sending a first transmission according to a first transmit-side power gain amount;
- using the modulator, generating and sending a second transmission according to a second different transmit-side power gain amount;
- receiving back a response indicating receive-side power gain amounts for the first and second transmissions;
- determining a third transmit-side power gain amount by analyzing the response;

using the modulator, generating and sending a third transmission according to the third transmit-side power gain amount;

receiving a session initiation request originating from a remote device;

setting a bit in an acknowledgement message to cause a delay in initiating the session; and sending the acknowledgement message with the set bit.

11. The method of claim 10, wherein at least one of the first, second, and third transmissions are sent after or in conjunction with sending the acknowledgement message and before a delayed session initiation.

12. A method, comprising:

transmitting communications to pass through a Bluetooth connection between a navigation device and a mobile phone and a wireless voice channel of a wireless telecommunications network associated with the mobile phone;

inputting a digital bit sequence into a modulator to generate an audio signal that has different frequency tones for different bit values, wherein the frequency tones are selected to pass through the wireless voice channel unobstructed by vocoders operating within the wireless telecommunications network;

using the modulator, generating and sending a first transmission according to a first transmit-side power gain amount;

using the modulator, generating and sending a second transmission according to a second different transmit-side power gain amount;

receiving back a response indicating receive-side power gain amounts for the first and second transmissions;

determining a third transmit-side power gain amount by analyzing the response;

using the modulator, generating and sending a third transmission according to the third transmit-side power gain amount;

determining a mode of operation of a vocoder of the mobile phone or a vocoder of the wireless telecommunications network;

generating an entry in a navigation device table to associate the third transmit-side power gain amount with the mobile phone; and in the generated entry, recording the determined mode of operation such that the third transmit-side power gain amount is associated with the determined mode of operation.

13. The method of claim 12, wherein the navigation device comprises a portable personal navigation device.

14. The method of claim 12, wherein the navigation device comprises an in-vehicle navigation device that is installed in a vehicle.

* * * * *